United States Patent [19]

Okuda et al.

[11] Patent Number: 5,225,730
[45] Date of Patent: Jul. 6, 1993

[54] PROJECTION CATHODE RAY TUBE

[75] Inventors: Hiroshi Okuda; Yasuo Iwasaki, both of Nagaokakyo, Japan

[73] Assignee: Mitsubishi Denki Kabushiki Kaisha, Tokyo, Japan

[21] Appl. No.: 602,683

[22] Filed: Oct. 24, 1990

[30] Foreign Application Priority Data

Oct. 24, 1989 [JP] Japan .................. 1-277540

[51] Int. Cl.$^5$ .................. H01J 29/10; G02B 5/22
[52] U.S. Cl. .................. 313/474; 313/112; 313/466; 313/473; 358/253; 359/359; 359/587; 359/589
[58] Field of Search .............. 313/112, 474, 473, 466; 358/237, 250, 253; 350/1.6; 359/359, 586, 587, 589

[56] References Cited

U.S. PATENT DOCUMENTS

| | | | |
|---|---|---|---|
| 3,185,020 | 5/1965 | Thelen | 359/586 |
| 4,634,926 | 1/1987 | Vriens et al. | 313/474 |
| 4,642,695 | 2/1987 | Iwasaki | 358/237 |
| 4,683,398 | 7/1987 | Vriens et al. | 313/474 |
| 4,798,994 | 1/1989 | Rijpers et al. | 313/478 |
| 4,804,884 | 2/1989 | Vriens et al. | 313/474 |
| 4,859,902 | 8/1989 | De Leeuw et al. | 313/474 |
| 5,089,743 | 2/1992 | Okuda et al. | 313/474 |

FOREIGN PATENT DOCUMENTS

| | | |
|---|---|---|
| 359345 | 3/1990 | European Pat. Off. |
| 2330898 | 1/1975 | Fed. Rep. of Germany |
| 0039349 | 2/1986 | Japan |
| 0273837 | 12/1986 | Japan |

Primary Examiner—Donald J. Yusko
Assistant Examiner—Ashok Patel

[57] ABSTRACT

A projection cathode ray tube (CRT) includes a multilayered interference film interposed between a face plate pane and luminescent material layer. This multilayered interference film is composed of alternately superimposed of high refractive index material layers and low refractive index material layers, and the number of layers to be superimposed is four or five. By using a multilayered interference film of only four or five layers, the interference layer is not subject to cracks or film separation occurring during heat processing, due to the difference in thermal expansion coefficients between high and low refractive index material. Further, there still remains enough layers to produce a display highly improved in brightness in the direction of the normal of the face plate pane of the CRT.

10 Claims, 3 Drawing Sheets

PROJECTION CATHODE RAY TUBE

BACKGROUND OF THE INVENTION

1. Field of the Invention

This invention relates to a projection cathode ray tube in which an image on a phosphor layer is enlarged and projected on a screen, located at a given distance ahead through a projection lens unit, in front of the phosphor layer.

2. Description of the Related Art

The U.S. Pat. No. 4,642,695 discloses an example for the improvement in efficiency for gathering luminous flux into the projection lens unit from each of the monochromatic cathode ray tubes.

In a conventional cathode ray tube, light emitted from a phosphor screen is in a state of highly close to, what is called, completely scattered light. In a projection television apparatus, a luminous flux emitted from the phosphor screen within the divergent angle of 30° is exclusively utilized, while the other becomes useless luminous flux. According to the above-disclosed example, the brightness of an image on a screen of the projection television is greatly enhanced by converging 30% or more of all luminous flux emitted from elements of the light-emitting phosphors into a cone-shaped area having the divergent angles within −30° to 30°.

Further, according to the publication of the Japanese Laid-open Patent Application No. 61-273837, there is disclosed a projection type cathode ray tube having a multilayered interference filter composed of alternately superimposed high refractive index material layers and low refractive index material layers, disposed between the inner surface of a face plate pane of the cathode ray tube and a luminescent material layer provided at the innermost of the cathode ray tube, for example. As examples of structural components, tantalum pentoxide ($Ta_2O_5$) or titanium dioxide ($TiO_2$) is used as the high refractive index material, whereas silicon dioxide ($SiO_2$) or magnesium fluoride ($MgF_2$) is used as the low refractive index material. In general, the multilayered interference film is formed of the low refractive index material layers and the high refractive index material layers alternately superimposed in six layers or more.

In a projection cathode ray tube having a conventional multilayered interference film disposed upon the inner surface of the face plate pane, the optical thickness nd of each layer of the multilayered interference film is between 0.2 and 0.3 $\lambda_f$ in accordance with the example disclosed in the publication of the Japanese Laid-open Patent Application No. 61-273837. Specifically, according to this example, the projection cathode ray tube comprises a multilayered interference film composed of six or more layers, the optical thickness nd of which is within 0.23 to 0.25 $\lambda_f$, namely, around $\lambda_f/4$. Here, the following equation is obtained:

$$\lambda_f = p \times \lambda$$

where $\lambda$ denotes a desired central wavelength selected from the emission spectrum of the luminescent material; p, a value in the range from 1.18 to 1.32. As another example, the publication of the Japanese Laid-open Patent Application No. 61-39349 discloses a projection cathode ray tube having a multilayered interference film composed of layers superimposed within 14 to 30 layers, the optical thickness of which is almost the same as that of the aforementioned example.

The cathode ray tube is generally fabricated through the manufacturing processes as shown in FIG. 2. In these processes, cathode ray tubes are typically manufactured passing through the heat processing steps three times, the temperature of which is approximately within the range of 350° C. to 450° C., such as baking, frit sealing and exhaust steps. In view of the heat processing, before passing through the above-described manufacturing steps, the cathode ray tubes have previously been processed by baking at the temperature ranging from 450° C. to 500° C. so as to secure the multilayered interference film which has been deposited by the evaporation.

However, in the existing multilayered interference film mentioned above, the number of layers comprised therein becomes a great number; for example, it amounts to six or more layers, sometimes up to 14 to 30 layers. Therefore, there is a disadvantage that because of the difference in the thermal expansion coefficients between the high refractive index material and the low refractive index material of the multilayered interference film, a thermal distortion occurs at each layer of the multilayered interference film due to the aforementioned heat processing, thereby causing cracks or a film separation.

SUMMARY OF THE INVENTION

This invention aims to solve the above-described drawbacks of the conventional cathode ray tubes. The purpose of the present invention is to provide a projection cathode ray tube equipped with a multilayered interference film which is not subject to the cracks or film separation due to the heat processing. In one aspect of the present invention, there is provided a projection cathode ray tube comprising: a luminescent material layer disposed upon the inner surface of a face plate pane; and a multilayered interference film composed of alternatively superimposed of high refractive index material layers and low refractive index material layers and inserted between the luminescent layer and the face plate pane, wherein the multilayered interference film comprises four or five layers of interference film.

Practically, an optical thickness of each layer of the multilayered interference film is set to $\lambda_h/4$. Here, $\lambda_h/4$ is expressed as $$\lambda_h = \lambda + \lambda_p \text{(a value between 20 nm and 100 nm)}.$$

where $\lambda$ denotes a central wavelength selected from the emission spectrum of the luminescent material, $\lambda_p$ is a desired wavelength ranging from 20–100 nm; and $\lambda_h$ is the optical spectrum transmissivity of the multilayered interference filter for yielding a transmissivity of 50%.

With this arrangement, it is possible to secure a sufficient efficiency of gathering luminous flux emitted from the phosphor screen (luminescent material layer) into the projection lens unit, positioned in front of the cathode ray tube, passing through the reduced number of interference layers, thereby preventing the cracks or the film separation due to heat processing.

The above and other advantages, features and additional objects of this invention will be manifest to those versed in the art upon making reference to the following detailed description and the accompanying drawings in which several structural embodiments incorporating the principles of this invention are shown by way of illustrative example.

BRIEF DESCRIPTION OF THE DRAWINGS

In FIG. 4, a reference A designates a transmission wavelength area; B, a transition area at which the transmittance characteristics may change from the transmission wavelength area to the nontransmission wavelength area; C, a nontransmission wavelength area or a low transmission wavelength area; I, a graph illustrating a the transmittance characteristics of a multilayered interference film being consisted of ten or more layers.

DETAILED DESCRIPTION OF THE PREFERRED EMBODIMENTS

A projection cathode ray tube in accordance with a first embodiment of the present invention will now be described hereinbelow.

Figure 1:
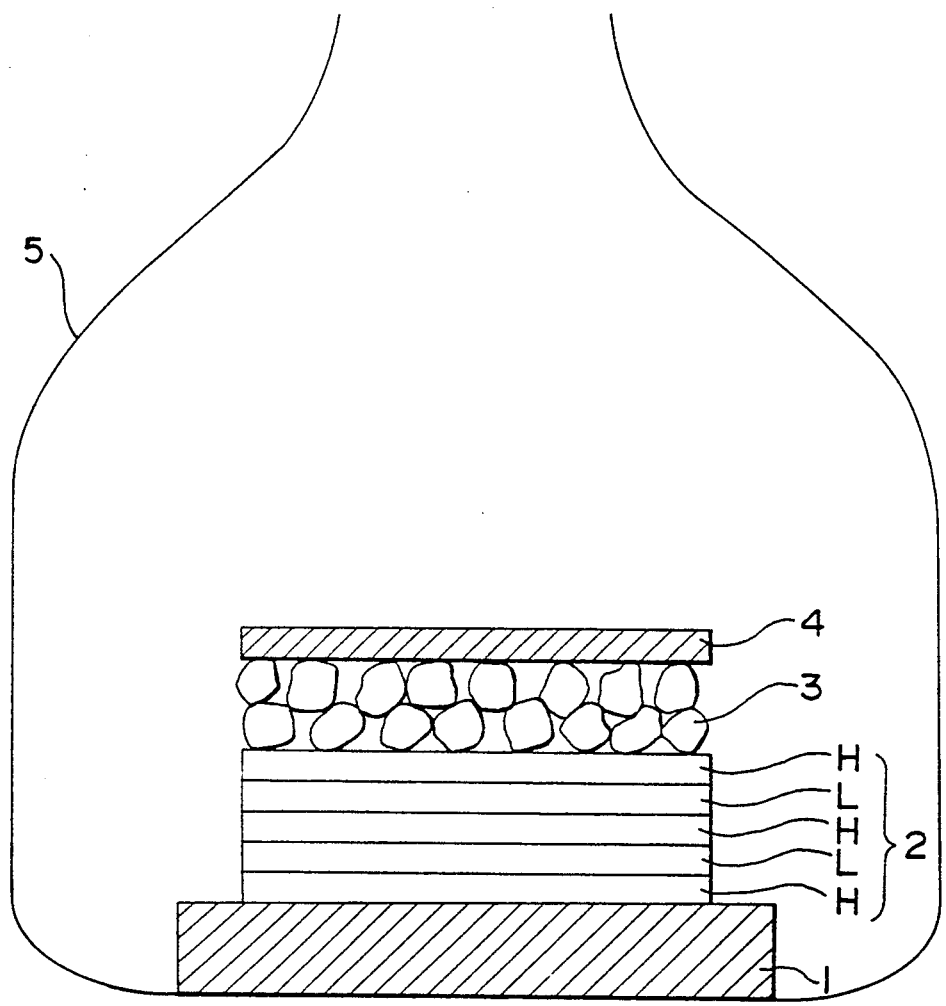
FIG. 1 is a fragmentary sectional view illustrating a face plate pane of a projection cathode ray tube in accordance with one embodiment of a present invention in which a reference numeral 1 designates a face plate pane; 2, a multilayered interference filter in which H designates a high refractive index material layer and L denotes a low refractive index material layer; 3, a luminescent material layer; 4, an aluminum evaporation film for forwardly reflecting a partial light, which is scattered in the direction opposite to the face plate pane, among the light emitted from the luminescent material layer.
Figure 2:
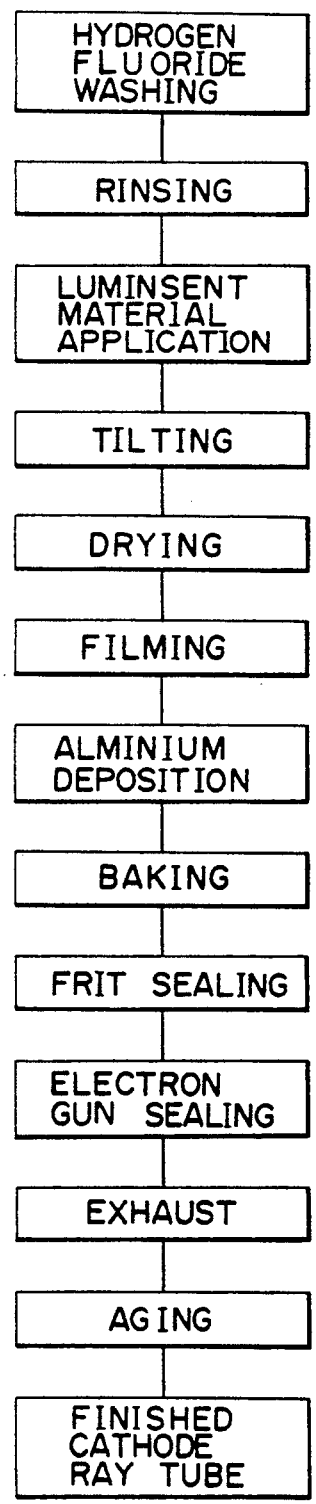
FIG. 2 is a flow diagram illustrating manufacturing processes of a projection cathode ray tube comprising a multilayered interference film.

FIG. 1 is a fragmentary sectional view illustrating a face plate pane of a projection cathode ray tube 5 incorporating a multilayered interference film in accordance with a first embodiment of the present invention.

In FIG. 1, a reference numeral 1 designates a face plate pane; 2, a multilayered interference film; 3, luminescent material layer; 4, an aluminum evaporation film for reflecting a partial light, which is scattered in the direction opposite to the face plate pane 1, among the light emitted from the phosphor screen forwardly out of the cathode ray tube 5.

Figure 3:
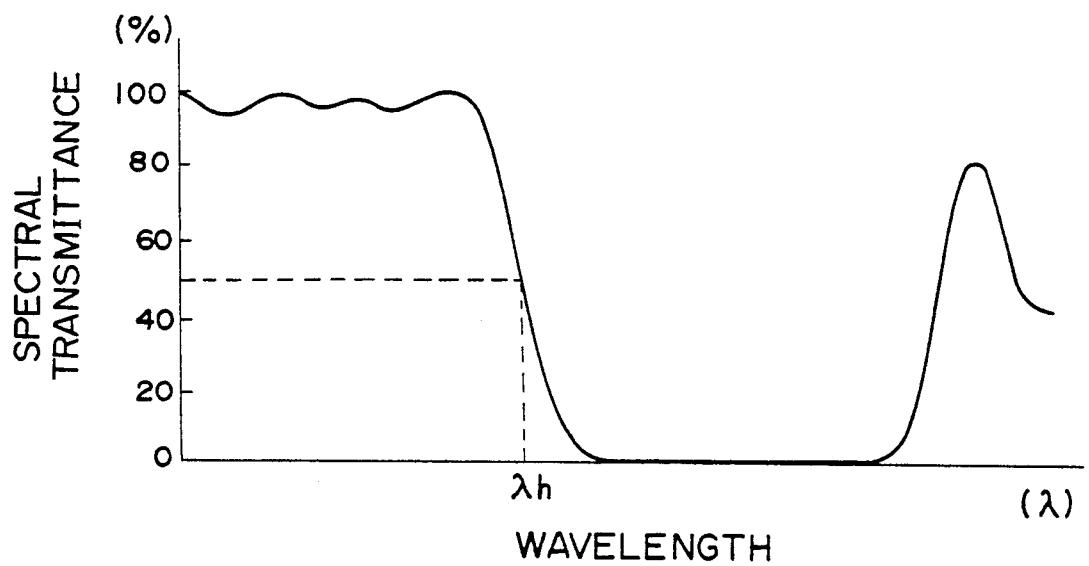
FIG. 3 is a characteristic graph showing a transmissivity of a multilayered interference film, where $\lambda_h$ denotes a wavelength at which a transmissivity is 50%.

In a first experimentally fabricated cathode ray tube in accordance with a first embodiment of the present invention, there is obtained a projection cathode ray tube 5 equipped with a multilayered interference film consisting of five layers, each layer having an optical thickness of $\lambda_h/4$, alternately superimposed of high refractive index material layers made up of tantalum pentoxide ($Ta_2O_5$) and low refractive index material layers made up of silicon dioxide ($SiO_2$), and having a wavelength of $\lambda_h = 615$ nm relative to the green-luminescent phosphor screen which is activated with terbium (Tb) and has the wavelength $\lambda$ within 544 nm to 545 nm. Here, the following equation is established.

$$\lambda_h = \lambda_p + \lambda,$$

where $\lambda_h$ denotes a wavelength whose transmissivity becomes 50% with respect to the optical transmissivity spectral characteristics of the multilayered interference film shown in FIG. 3; $\lambda_h$, a desired central wavelength selected from the light-emitting spectrum of the luminescent material; and $\lambda_p$ a value between 20 nm and 100 nm. When the cathode ray tube is experimentally fabricated, there occurred no separation of the multilayered interference film which frequently occurs in the conventional manufacturing processes even when the cathode ray tube has repeatedly been processed through the heat processing steps.

Further, in light of the optical characteristics, it was confirmed that the brightness is enhanced by about from 150% to 170% in the direction of optical normal of the face plate pane in comparison with the cathode ray tube without the multilayered interference film. Moreover, owing to the filter characteristics of the multilayered interference film, the color tone and contrast of images are improved.

In the multilayered interference film, a cutoff wavelength of the optical transmittance characteristics is determined by the optical thickness nd of each layer. Here, the reference symbols n and d express the refraction index and the thickness, respectively. Also, the number of the layers to be superimposed defines the effectiveness of the filter characteristics with respect to the optical transmittance characteristics. In regard of the number of the layers included in the multilayered interference film, the Japanese Laid-open Patent Application No. 61-39349 describes that when the number of the layers is small, an angle, or an acceptance angle at which the magnitude of reflected luminous flux is extremely reduced, does not become small so much and it becomes difficult to obtain the sufficient luminous flux gathered into the projection lens unit. To specify the position of the edge of the multilayered interference film at which the transmissivity varies, namely, to precisely specify the $\lambda_f$ in the following equation $$\lambda_f = p\lambda$$

and to reduce the acceptance angle, it is necessary to provide a large number of layers in the cathode ray tube. To this end, the Japanese Laid-open Patent Application No. 61-39349 discussed that the multi-layered interference should preferably be consisted of substantially 14 to 30 layers.

Likewise, the Japanese Laid-open Patent Application No. 61-273837 discloses the transmittance characteristics obtained by the multilayered interference filters consisted of six or more layers. As the embodiments, the transmittance characteristics obtained respectively from the filter consisted of 14 layers and that of 30 layers are disclosed in the above-mentioned application.

In production, however, the more number of layers to be superimposed increases, the larger the thermal deformation becomes which occurs at each layer due to the heat processing, and the more the multilayered interference film becomes liable to cracks and film separation.

In the first embodiment of the present invention, since the multilayered interference film consists of five layers, the problems disclosed in aforementioned Japanese Laid-open Patent Application No. 61-39349—that is, the acceptance angle becomes larger—remains unsolved. However, when the cutoff wavelength is properly selected, the loss of the luminous flux is extensively reduced in the direction of the normal of the multilayered interference film, namely, in the direction in which the luminous flux is emitted in parallel with the normal line. As a result, there is obtained a projection cathode ray tube having a multilayered interference film which is not subject to the cracks and film separation.

Figure 4:
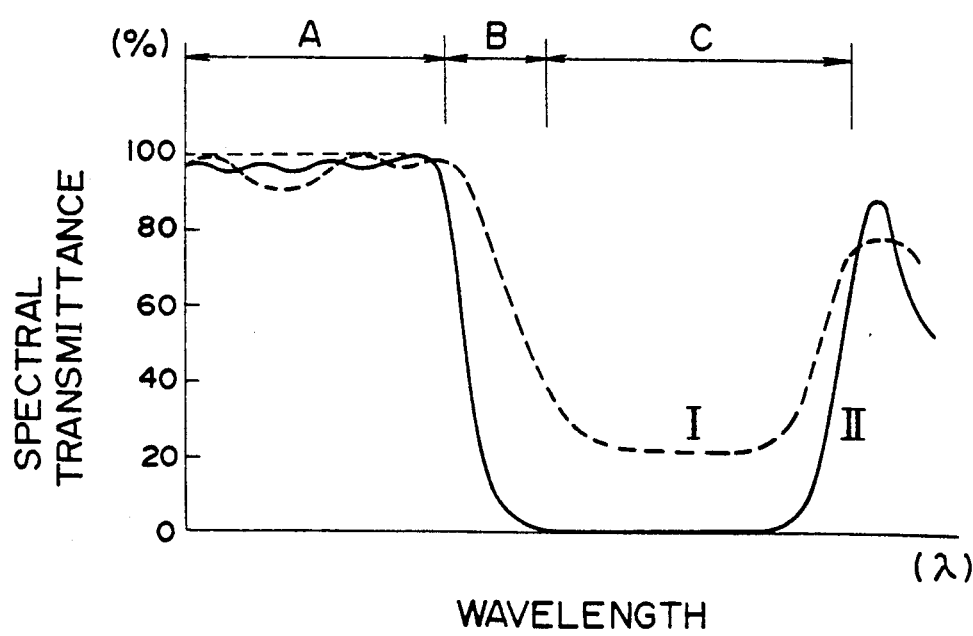
FIG. 4 is a characteristic graph illustrating the transmissivity of a multilayered interference film which varies in response to the number of layers.

Selecting a proper cutoff wavelength means that it is necessary to adjust the $\lambda_h$ to the area having the longer wavelength because, according to the transmissivity curve of the luminous flux shown in FIG. 4, the less the number of the layers constituting the interference film becomes the gentler becomes the inclination of the slope at which the transmittivity shows a sharp decline becomes, i.e., the B area of FIG. 4 and the more the transmissivity increases in the wavelength area, where the transmissivity is small, that is, the C area of FIG. 4. Particularly, as mentioned in the embodiment, it is preferable to set the $\lambda_h$ to the values within 20 nm to 100 nm under the equation of $\lambda_h = \lambda_p + \lambda$.

Second and third experimental fabrications in accordance with the preferred embodiments of the present invention will now be explained.

As a result of the second experimental fabrication of a cathode ray tube embodying the present invention, it could obtain a projection cathode ray tube comprising the multilayered interference film composed of four layers alternately superimposed of tantalum pentoxide ($Ta_2O_5$) and silicon dioxide ($SiO_2$), having the $\lambda_h$ of 520 nm, and the layer the optical thickness of which is $\lambda_h/4$ with respect to the blue phosphors which are formed of zinc sulfide and activated with silver, and has the $\lambda$ of 450 nm.

In the second experimental fabrication, like the first experimental fabrication, no cracks and film separation, which frequently occur with the conventional structure have ever been observed after the film is manufactured, passing through the heat processing steps several times. Further in view of the optical characteristics, the brightness is enhanced by about 140% to 150% in the direction of the normal of the face plate pane, as compared with the projection cathode ray tube having no multilayered interference film. Moreover, the color tone and contrast of the second experimental cathode ray tube are improved in the same manner as that attained by the first experimentally fabricated cathode ray tube.

In the third experimental fabrication, it could obtain a projection cathode ray tube composed of five layers alternately superimposed of titanium dioxide ($TiO_2$) and silicon dioxide ($SiO_2$) having the central wavelength of 615 nm; and having the layer the optical thickness of which is $\lambda_h/4$ with respect to the green phosphors activated with terbium (Tb) and having the $\lambda$ of 544 to 545 nm.

In this third experimental fabrication, like the first experimental fabrication, the similar results were obtained in respect of the cracks, the film separation, and the optical characteristics.

Although the explanation is merely given to the embodiments utilizing tantalum pentoxide ($Ta_2O_5$) or titanium dioxide ($TiO_2$) for a high refractive index material and silicon dioxide ($SiO_2$) for a low refractive index material, through the experiments it is confirmed that with the help of the structure in which the interference is consisted of 4 or 5 layers it becomes possible to obtain the projection cathode ray tube having a multilayered interference film which is not subject to the cracks and film separation after having completed the heat processing for securing the multilayered interference film or the heat processing performed several times in the manufacturing process of the cathode ray tube even when other materials are employed for the components of the interference film instead of the above-mentioned materials. Such materials as niobium pentoxide ($Nb_2O_5$) or zinc sulfide (ZnS) can be used for a high refractive index material and magnesium fluoride can be used for a low refractive index material.

As another embodiment of the present invention, although the explanation is simply given to the green and blue luminescent materials, the same structure is applicable to the red phosphors of yttrium oxide ($Y_2O_3$) activated with europium (Eu).

It should be understood that it is impossible to obtain desired optical characteristics with the interference film having only the three layers, and therefore a cathode ray tube having such structure is not suitable for practical use.

As described above, in accordance with the present invention, with respect to the projection cathode ray tube comprising a phosphor screen formed of a luminescent material layer disposed upon the inner surface of a face plate pane and a multilayered interference film disposed between the phosphor screen and the face plate pane and composed of a plurality of layers alternately superimposed of a high refractive index material and a low refractive index material, since the number of the multilayered interference layers to be superimposed is limited to four or five layers, the brightness is highly improved in the direction of the normal of the face plate pane, thereby making it possible to obtain the projection cathode ray tube the multilayered interference film of which is not subject to the cracks and film separation after passing through the several heat processing steps in the manufacturing processes.

What is claimed is:

1. A projection cathode ray tube comprising:
   a luminescent material layer disposed on an inner surface of a face plate pane of the cathode ray tube; and
   a multilayered interference film composed of alternately superimposed high refractive index material layers and low refractive index material layers, interposed between said luminescent material layer and said face plate pane, wherein said multilayered interference film consists of four layers.

2. A projection cathode ray tube according to claim 1, wherein said luminescent material layer is activated with terbium (Tb), and is provided with light-emitting phosphors; said high refractive index material layer is composed of tantalum pentoxide ($Ta_2O_5$); and said low refractive index material is composed of silicon dioxide ($SiO_2$).

3. A projection cathode ray tube according to claim 2, wherein an optical thickness of each layer of said multilayered interference film is determined to be $\lambda_h/4$, where $\lambda_h$ is a wavelength where transmissivity of the multilayered interference film is equal to fifty percent and is expressed as $\lambda_h = \lambda + \lambda_p$, where $\lambda_p$ is a wavelength ranging between 20 nm and 100 nm, and $\lambda$ denotes a central wavelength selected from luminous spectrum of luminescent material of said luminescent material layer.

4. A projection cathode ray tube according to claim 1, wherein said luminescent material layer is activated with silver (Ag); said high refractive index material is composed of tantalum pentoxide ($Ta_2O_5$); and said low refractive index material is composed of silicon dioxide ($SiO_2$).

5. A projection cathode ray tube according to claim 3, wherein the optical thickness of each said multilayered interference film is preset to 615 nm.

6. A projection cathode ray tube comprising:
a luminescent material layer disposed upon an inner surface of a face plate pane of the cathode ray tube; and
a multilayered interference film composed of alternately superimposed high refractive index material layers and low refractive index material layers, interposed between said luminescent material layer and said face plate pane, wherein said multilayered interference film consists of five layers.

7. A projection cathode ray tube according to claim 6, wherein said luminescent material layer is activated with terbium (Tb), and is provided with light-emitting phosphors; said high refractive index material layer is composed of tantalum pentoxide ($Ta_2O_5$); and said low refractive index material is composed of silicon dioxide ($SiO_2$).

8. A projection cathode ray tube according to claim 7, wherein an optical thickness of each layer of said multilayered interference film is determined to be $\lambda_h/4$, where $\lambda_h$ is a wavelength where transmissivity of the multilayered interference film is equal to fifty percent, and is expressed as $$\lambda_h = \lambda + \lambda_p,$$

and $\lambda$ denotes a central wavelength selected from a luminous spectrum of luminescent material of said luminescent material layer.

9. A projection cathode ray tube according to claim 6, wherein said luminescent material layer is activated with silver (Ag); said high refractive index material is composed of tantalum pentoxide ($Ta_2O_5$); and said low refractive index material is composed of silicon dioxide ($SiO_2$).

10. A projection cathode ray tube according to claim 8, wherein the optical thickness of each said multilayered interference film is preset to 615 nm.

* * * * *